(No Model.) 2 Sheets—Sheet 1.
C. ROBERTS.
POTATO DIGGER.
No. 403,375. Patented May 14, 1889.
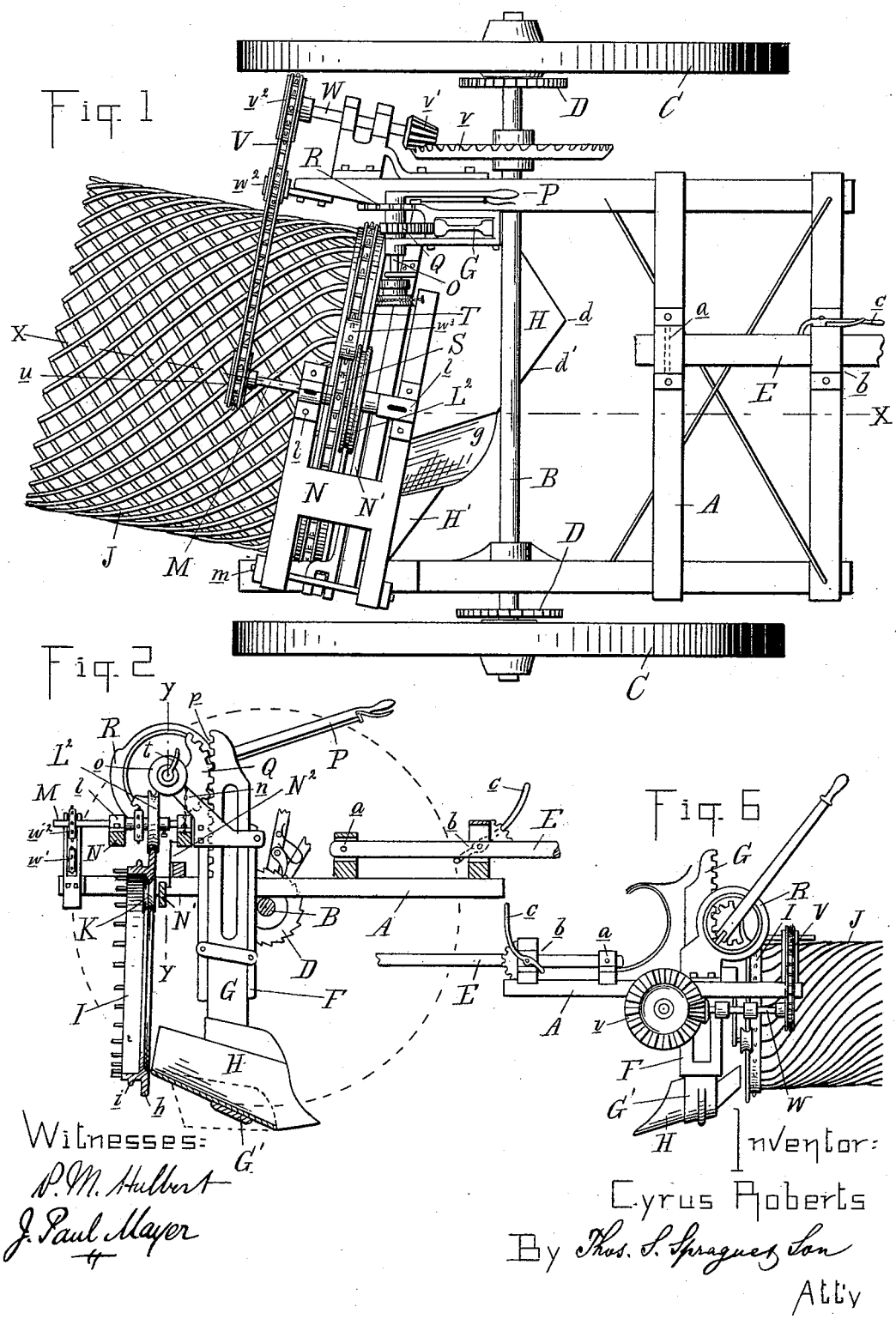
Witnesses:
P. M. Hulbert
J. Paul Mayer
Inventor:
Cyrus Roberts
By Thos. S. Sprague & Son
Atty

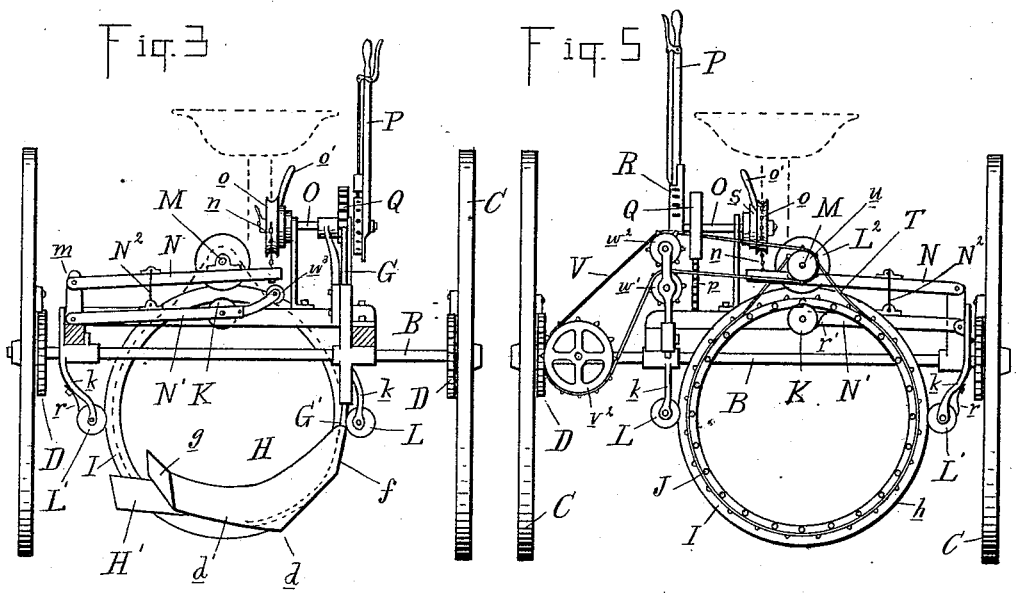

UNITED STATES PATENT OFFICE.

CYRUS ROBERTS, OF THREE RIVERS, MICHIGAN.

POTATO-DIGGER.

SPECIFICATION forming part of Letters Patent No. 403,375, dated May 14, 1889.

Application filed December 26, 1888. Serial No. 294,721. (No model.)

*To all whom it may concern:*

Be it known that I, CYRUS ROBERTS, a citizen of the United States, residing at Three Rivers, in the county of St. Joseph and State of Michigan, have invented certain new and useful Improvements in Potato-Diggers, of which the following is a specification, reference being had therein to the accompanying drawings.

This invention relates to new and useful improvements in potato-diggers, and the invention is designed to form an improvement on Letters Patent granted to me June 26, 1888, No. 385,071.

My invention consists in the improved construction, arrangement, and combination of the different parts, all as more fully hereinafter described and fully pointed out in the claims.

In the drawings which accompany this specification, Figure 1 is a plan view of my improved potato-digger. Fig. 2 is a vertical central longitudinal section thereof on line X X in Fig. 1. Fig. 3 is a front elevation of the plow and rotary cage raised up as they appear when out of operation. Fig. 4 is a plan view similar to Fig. 1, but with the raising and lowering device of the plow and cage, and with the drive-connection of the cage left out. Fig. 5 is a rear elevation of the potato-digger. Fig. 6 is a side elevation of the same with one of the ground-wheels omitted, and Fig. 7 is a vertical section on line Y Y in Fig. 2.

A is the frame of the digger, which supports the operating parts.

B is the drive-axle, journaled transversely in suitable bearings on the frame.

C are two ground-wheels, loosely revolving on the axle and supporting the machine.

D are the ratchets, fast upon the axle and provided with suitable dogs to connect the ground-wheels with the ratchet, if desired, to revolve the axle with the wheels.

E is a tongue to which the horses are hitched, and this is pivotally secured at $a$ and vertically adjustable at $b$, so as to change the line of draft in its vertical plan by raising or lowering the tongue at $b$, preferably by means of a suitable hand-lever, $c$, which is within reach of the driver on his seat.

F is a vertical guide-bearing secured to one of the side bars of the frame.

G is the standard of the plow, slidingly engaging with its vertical portion into the guide-bearing F. The lower end of this standard extends laterally and forms a shoe, G', upon which the plow is secured.

The plow H is substantially of the nature of a scoop-shovel, and is provided with a suitable large middle share to dig under and scoop up the potato-hills, and this share has preferably a point, $d$, and its front edge, $d'$, is set at an angle to the line of draft. Suitably-inclined sides $f$ and $g$ retain the plow on the ground and direct it to the rear as the plow advances. A rotary cylindrical cage is mounted in rear of the plow to receive the ground and separate the potatoes therefrom. This cage consists of an annular head or ring, I, and of spiral rods or spring-tines J, secured to the ring in any suitable manner and projecting rearwardly, whereby they form a spiral cage, as shown.

The ring I has an outwardly-projecting annular flange, $h$, and is provided circumferentially with the sprocket-teeth $i$. Upon the inner face the ring forms suitable bearings for the roller K, on which the cage is supported clear of the ground above its vertical center, or nearly so. In addition to this supporting inside roller there are three more rollers, L, L', and L'', suitably grooved to engage with the flange $h$ on the outside of the ring to firmly hold the cage in position free to revolve on its axis. The rollers L and L' are secured to the frame by means of suitable hangers, $k$, and engage with the flange $h$ upon the two opposite sides, so as not to interfere with the free raising and lowering of the cage, and the roller L'' engages with the flange $h$ centrally above the cage, and it is secured upon a shaft, M. This shaft M lies parallel to the axis of the cage and revolves in suitable bearings, $l$, secured to the hinged frame N. This frame is hinged at $m$ to the main frame, and, projecting laterally above the same, has its free end secured in any suitable manner—such as by a rope or chain, $n$—to the winding-roller $o$ on the rock-shaft O, whereby it is risingly and fallingly supported.

The rock-shaft O is stationarily journaled in suitable bearings upon the main frame, and is actuated by the hand-lever P, secured thereon in proximity to the seat of the driver.

A toothed segment, Q, is secured upon the rock-shaft, and this engages with a rack, p, formed on the upper end of the plow-standard at the rear edge thereof. A suitable notched quadrant, R, is provided in connection with the lever P to adjust said lever by means of its spring-pawl into any desired position, as in the usual manner of constructing such levers.

The winding-roller o is adjustably secured to the rock-shaft O, preferably as shown in Fig. 7, wherein said winding-roller is placed loosely upon the shaft and provided with a laterally-projecting spur, q, which engages with one of a concentric series of adjusting-holes, q', formed in the side of the fixed collar s, which is secured upon the rock-shaft. A suitable nut, t, upon the end of the rock-shaft holds the winding-roller into its adjusted engagement with the collar s.

The shaft M has secured upon it the sprocket-wheel S, and a chain, T, passes around this sprocket-wheel and the sprockets on the head of the cage to communicate motion to the cage. Another sprocket-wheel, u, on the shaft M engages with a sprocket-chain, V, which transmits motion from the axle of the potato-digger to the shaft M. To this end a bevel gear-wheel, v, is fastened upon the axle. This engages with the bevel-pinion v' on a shaft, w, which is also provided with a sprocket-wheel, v''. The sprocket-chain V passes around the sprocket-wheels v'' u and over two idlers, w'' and w', suitably supported upon the main frame to change the direction of the sprocket-chain unto the shaft M, so that the chain will not bind when the hinged frame N is raised or lowered.

The supporting-roller K of the cage is secured to a hinged frame, N', which is hinged correspondingly to the frame N, but independently below the same, and is supported in position parallel, or nearly so, to the frame N by the hanger N'', connecting the two frames.

The roller L' is provided with a scraper, r, and a similar scraper, r', is provided in proximity to the supporting-roller K to clean the bearing of this roller on the head of the cage in advance of said roller. As the arrangement and construction of the different parts throw the forward end of the cage to one side, I preferably mount the cage at an angle to the line of draft to bring its rear into the center again.

In practice, the parts being constructed and arranged substantially as described and shown, they are intended to operate substantially as follows: The driver from his seat has control of the lever P. By disengaging said lever from its notched quadrant R he can throw it forward or rearward to simultaneously lower or raise the plow and cage. The plow is lowered into the ground or raised from the ground through the medium of the toothed segment Q engaging into the rack of the plow-standard, while at the same time the cage is raised or lowered correspondingly thereto by the winding or unwinding of the chain or cord n on the winding-roller o, which risingly and fallingly actuates the frames N and N', the latter carrying the cage by means of the supporting-roller K. The larger degree of movement necessary to raise or lower the plow than is required for the cage is effected by making the radius of the winding-roller o less than the radius of the segment Q—say one-half. Thus, if it is necessary to raise the plow six inches to bring it clear of the ground the cage will rise three inches. As the cage has to be in its operating position in proper juxtaposition to the rear end of the plow, so as to cause the dirt to pass from the plow into the cage, it is necessary to provide an independent relative adjustment between the plow and the cage to restore the proper relative position between them if the plow is required to dig at a different depth from the one to which it is adjusted, and to this end the winding-roller o is adjustably secured upon its shaft.

In digging potatoes motion is communicated to the axle by having the dogs of the ratchets D thrown into gear. From the axle the motion is then communicated to the shaft w through the medium of the gear-wheels v and v', and from the shaft w motion is communicated through the medium of the sprocket-chain V to the shaft M, and from the shaft M the motion is imparted to the sprocket-chain I around the head of the cage. This sprocket-chain is merely tight enough to communicate motion to the cage, but does not support the weight of the cage, and a suitable tightener-sprocket, $w^3$, may be secured to the hinged frame N' to adjust the chain to operate in this manner. As the plow digs under the potato-hills in advance of the cage, all the dirt and potatoes together are carried up and over the shovel of the plow into the cage.

As the share of the plow is provided with the upturned sides g, the ground is prevented from being pushed off the sides of the share, and to leave a clear path for the full width of the cage without carrying more ground into it than is necessary an outside scraper, H', is secured to the plow to throw the ground and weeds out of the way of the cage. As the plow gradually assumes toward its rear end the circular shape corresponding to the head of the cage, the ground is readily carried into the cage without choking. As fast as the dirt with the potatoes is discharged into the cage the rapid revolutions of the latter will effect the separation, the ground passing through the interstices between the tines, and the potatoes rolling out toward the rear. The necessary incline to effect the proper separation is controlled by the driver through the medium of the lever c in front of him, by means of which he can tip the cage to adjust it for plowing up or down hill.

Having now described the construction and operation of my potato-digger, I will more spe- cifically point out the improvements accomplished and the advantages sought to be obtained thereby.

In my former construction, as described in the above-mentioned Letters Patent, the tines of the cage were substantially straight and set spirally or obliquely into the head, while in my present construction I have a spiral cage. This gives me at least one-fourth more length of space for separating the earth or dirt from the potatoes before the latter pass out at the rear end of the cage without lengthening it. The cage at the same time acts as a screw to force the dirt to the rearward as soon as it passes into the tines. This action is especially desirable to keep the cage free from weeds and to effect a positive discharge at the rear. With straight tines, or tines substantially so, the discharge depends altogether on a given rearward incline, either by setting the tines more or less outwardly or by dipping the cage to the rear. This is objectionable, as it is difficult to maintain the incline always on uneven ground and because the cage has to be set higher to revolve free of the ground.

In the construction of the cage described in my former patent there was a natural tendency to carry the material around and around, and, also, as the dirt passed out between the tines a portion would be carried up the outer circumference and was liable to be thrown all over the working parts of the machine and raise a cloud of dust in dry soil, to the great discomfort of the driver. With my present construction there is no such tendency. The inner face, as well as the outer face, and the interstices between the tines all have the same action of screwing the earth to the rear, and the carrying over and spreading of the soil over everything is thus avoided, while the potatoes and other material which cannot pass between the tines are positively discharged at the rear and in a small space, from which the potatoes can be picked up with half the labor.

By placing the axis of the cage at an angle to the line of draft, as shown, the potatoes will be deposited in the center of the machine, so that they will not be in the path of the wheel in digging the next row; but other advantages are obtained, whereby it will be seen that the potato-hills as they pass into the cage are torn up diagonally across, as the junction between the plow and the cage is not at right angles to the line of draft.

By making the tongue vertically adjustable under the control of the driver I am enabled to adjust the plow to the conditions of the ground—as, for instance, when operating in wet and sticky soil I am enabled by raising the tongue to throw the plow at a squarer angle against the soil, and the result is to get a harder pressure against the face of the plow, by means of which I am enabled to produce a scouring action upon the plow, which keeps the share clean even in the most sticky soil.

I have also found by experience that the altered adjustment of the cage obtained by thus changing the incline of the plow is necessarily required for the cage to meet the same conditions of soil, as when the dirt is wet and mucky it should remain in the cage a longer time, so as to insure a separation of the earth from the potatoes before the material can pass out at the rear. In light soil the reverse adjustment will meet the best conditions of operation.

In going up or down hill the potatoes may be prevented from rolling out of the cage by adjusting the line of draft up or down.

I am aware that the vertical adjustment of the frame to or from the tongue of the machine is old of itself; but the peculiar construction of my frame carrying the plow and cage and having its adjustment in relation to the line of draft under the control of the driver is a particular advantage of my machine.

Although the plow and cage are independent of each other both adjust in vertical line. Thus their proper relative position to each other is easily maintained and the construction and operation are greatly simplified. If desired at any time, the relative adjustment between the plow and the cage may be changed by means of the adjustability of the winding-roller $o$, as it will be seen in Fig. 7 that after unscrewing the nut $t$ the winding-roller may be disengaged from the collar $s$ and turned backward or forward upon the shaft O and be engaged into another adjusting-hole in the collar $s$. The winding-roller is provided for the purpose of easy adjustment with a handle, $o'$, to give the necessary purchase for raising the weight of the cage. The toothed segment Q, which lifts the plow out of its engagement with the standard, is also adjustably secured upon the shaft O by means of a set-screw or otherwise, so as to adjust the plow independently of the cage. By these adjustments the relative position of the cage to the plow can be obtained at any desired depth of digging for which it may be desired to adjust the plow.

Another improvement I have made over my above-described patent is the arrangement of the two frames N and N' to lift the cage. The connection with the lever P lifts the upper frame, N, and the hanger N'', connecting the upper and lower frames, lifts the lower frame, which carries the roller K, on which the cage is supported. Thus in raising the cage the roller K lifts the cage vertically, or substantially so, within the limit required. By this arrangement the cage rises and lowers freely without any liability of straining the chains or binding the cage within the rollers, as my former construction was liable to.

The manner of supporting and revolving the cage is very important, as all obstructing bearings upon which the vines or weeds are liable to catch or in which the dirt or stones may lodge have to be absolutely avoided, and as the work of revolving the cage full of material is very heavy all friction or liability to create it must be avoided. This object I have attained in a very perfect manner by supporting and holding the cage all together by rollers, which form anti-friction bearings, while at the same time their application on the outside and on the top of the cage removes them from any possibility of becoming entangled with weeds or vines or obstructed by dirt or stones, and the application of scrapers where required easily removes sticky ground. These features enable me to use my machine no matter how full of weeds, vines, or stones a field may be or how wet or sticky the soil is to work in. There is not a single projecting corner or obstructing bearing in my digger within the reach of weeds. The drive-chain V can run with a slight slack, and is not liable to bind if dirt should get between the head of the cage and the chain.

The manner of carrying the motion by means of the chain V from the shaft $w$ to the shaft M permits of the free rising and falling of the frame N in the raising and lowering of the cage. The advantage of raising and lowering the plow and cage jointly by one lever only during the work of plowing greatly facilitates the work of the driver and simplifies the construction, the independent adjustment being but rarely required.

By setting the cage at an angle to the line of draft I gain another point—namely, I can use a plow which approaches more nearly the ordinary plow—that is, one having a mold-board the lower or cutting edge of which recedes from the point of the plow. Such a plow requires much less draft for digging than the ordinary scoop-plow. My plow differs from the ordinary plow mainly in that instead of the mold-board I have a plowshare which raises the ground instead of turning it; but its digging-edge recedes from the point of the plow. If this plowshare were cut off at its rear edge at right angles to the line of draft, it would be found to be much higher near the standard than at the opposite side. By stopping it off at its rear edge, however, at an angle said rear edge will correspond with the circular shape of the cage.

What I claim as my invention is—

1. In a potato-digger, the combination, with the digging-plow, of the rotary cage consisting of an annular head provided with an outwardly-projecting flange and with rearwardly-projecting tines, and of supporting devices comprising the supporting-roller on the inside of the head and outside rollers upon the sides of the head and on top thereof engaging with the outwardly-projecting flange of the head, substantially as described.

2. In a potato-digger, the combination, with the digging-plow, of the rotary cage consisting of the annular head I, provided with the outwardly-projecting flange and the rearwardly-projecting tines, the supporting-roller K on the inside of the cage at the top thereof, the side bearing-rollers, L and L', and the top roller, L'', said rollers L, L', and L'' engaging with the flange on the head of the cage, substantially as described.

3. In a potato-digger, the combination, with the digging-plow, of the rotary cage consisting of an annular head provided with outwardly-projecting flange and with rearwardly-projecting tines, and of circumferential supporting devices comprising the supporting-roller K on the inside of the head and mounted upon a hinged frame risingly and fallingly supported, the outside rollers, L and L', stationarily secured to the frame of the machine and engaging with the flange $h$ on the head of the cage, and the top rollers, L'', engaging with the flange $h$ on the head of the roller and risingly and fallingly supported by a hinged frame connected to the hinged frame of the supporting-roller, substantially as described.

4. The combination, with the revolving cage, of a potato-digger provided with the head I and circumferential flange $h$, the drive-chain passing around the head of said cage, and the sprocket-wheel mounted on top of the cage, and of independent circumferential bearings for said cage, consisting of an inside roller, K, under the head of the cage, the outside rollers, L and L', and the top roller, L'', engaging with the flange on the head of the cage, substantially as described.

5. The combination of the revolving cage of a potato-digger provided with the head I and the circumferential flange $h$, the drive-chain passing around the head of said cage, and the sprocket-wheel mounted on the shaft M on top of the cage, the rising and falling frame N, on which the said shaft is mounted, the independent supporting-roller K under the head of the cage, the rising and falling frame N', upon which said roller is mounted, the connection between the frame N and N', the winding-roller $o$, from which the frame N is supported, the rock-shaft O, upon which said winding-roller is mounted, and the lever P, for actuating said rock-shaft, substantially as described.

6. The combination of the revolving cage provided with the head I and the circumferential flange $h$, the drive-chain passing around the head of said cage, and the sprocket-wheel mounted on the shaft M on top of the cage, the hinged frame N, on which the said shaft is mounted, the independent supporting-roller K under the head of the cage, the hinged frame N', upon which said roller is mounted, the connection between the frames N and N', the stationary outside roller, L'', on the shaft M on top of the cage, the winding-roller $o$, supporting the hinged frame N, the rock-shaft O, upon which the roller is adjustably secured, the lever P, for actuating the rock-shaft, the toothed segment secured to the rock-shaft, and the digging-plow provided with the rising and falling standard G, provided with the toothed rack $p$, engaging with the segment Q, all arranged substantially as described.

7. The combination, with the supporting-wheels, axle, and frame of a potato-digger, of the rock-shaft mounted on top of said frame and provided with a raising and lowering lever, and of a digging-plow risingly and fallingly supported by actuating connection with said rock-shaft, and the revolving cage risingly and fallingly supported by actuating-connection with the same shaft, substantially as described.

8. In a potato-digger, the combination of the supporting-wheels, axle, and frame thereof, the rock-shaft on top of said frame and provided with the raising and lowering lever, the toothed segment secured on said rock-shaft, the digging-plow provided with the toothed standard engaging with the said toothed segment, the winding-roller secured upon said rock-shaft, and the revolving cage suspended from said roller, substantially as described.

9. In a potato-digger, the combination of the supporting-wheels, axle, and frame thereof, the rock-shaft mounted on top of said frame and provided with the raising and lowering lever, the toothed segment secured on said rock-shaft, the digging-plow provided with the toothed standard engaging with said toothed segment, the winding-roller adjustably secured upon said rock-shaft, and the revolving cage suspended from said winding-roller, substantially as described.

10. In a potato-digger, the combination, with the plow, of the revolving cylindrical cage arranged to the rear of the plow and consisting of the annular head and spiral tines secured thereto and supported at their forward ends only, said cage being adapted to operate as a screw-discharge, substantially as described.

11. In a potato-digger, the combination, with the digging-plow having its discharge end to one side of the center of the plow, of the revolving cage mounted in the rear of said discharge end of the plow at an angle to the line of draft and having its discharge end in the center of the plow, with its teeth arranged spirally with their forward ends only supported, substantially as described.

12. In a potato-digger, the combination, with the revolving cage, of the digging-plow mounted in front of said cage and consisting of the standard G, risingly and fallingly secured to the frame of the plow, the central share, H, having the cutting-edge $d'$ and the point $d$, the upturned sides $f$ and $g$, and the outside scraper, H', substantially as described.

13. In a potato-digger, the combination, with the digging-plow, of the rotary cage consisting of an annular head provided with an outwardly-projecting flange, the circumferential bearing-rollers engaging with said head, and the supporting-roller on the inside of the head risingly and fallingly supported from the frame of the machine, substantially as described.

In testimony whereof I affix my signature, in presence of two witnesses, this 6th day of December, 1888.

CYRUS ROBERTS.

Witnesses:
J. PAUL MAYER,
N. R. SMITH.